US010767706B2

(12) United States Patent
Ishizaka et al.

(10) Patent No.: US 10,767,706 B2
(45) Date of Patent: Sep. 8, 2020

(54) AUTOMATIC TRANSMISSION AND FRICTIONAL ENGAGEMENT ELEMENT

(71) Applicant: MAZDA MOTOR CORPORATION, Hiroshima (JP)

(72) Inventors: Tomotaka Ishizaka, Hiroshima (JP); Tatsuhiko Iwasaki, Hiroshima (JP); Norio Iwashita, Hiroshima (JP); Tatsutoshi Mizobe, Hiroshima (JP); Kaori Sako, Hiroshima (JP); Tadashi Saito, Hiroshima (JP); Tomohiro Kubo, Hiroshima (JP); Manabu Sasahara, Hiroshima (JP); Yutaro Fukuda, Hiroshima (JP); Shinya Kamada, Kure (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 241 days.

(21) Appl. No.: 15/761,685

(22) PCT Filed: Mar. 21, 2017

(86) PCT No.: PCT/JP2017/011229
§ 371 (c)(1),
(2) Date: Mar. 20, 2018

(87) PCT Pub. No.: WO2017/169980
PCT Pub. Date: Oct. 5, 2017

(65) Prior Publication Data
US 2018/0347639 A1  Dec. 6, 2018

(30) Foreign Application Priority Data

Mar. 29, 2016  (JP) ................................. 2016-066371

(51) Int. Cl.
*F16D 25/063* (2006.01)
*F16H 61/02* (2006.01)
(Continued)

(52) U.S. Cl.
CPC ....... *F16D 25/063* (2013.01); *F16D 25/0638* (2013.01); *F16D 25/14* (2013.01);
(Continued)

(58) Field of Classification Search
CPC .... F16D 25/063; F16D 25/0638; F16D 25/14; F16D 2125/10; F16H 61/0265; F16H 61/686; F16H 63/3026
See application file for complete search history.

(56) References Cited

U.S. PATENT DOCUMENTS

| 3,690,429 A | 9/1972 | Honda |
| 4,020,933 A | 5/1977 | Gill |

(Continued)

FOREIGN PATENT DOCUMENTS

| CN | 102734344 A | 10/2012 |
| CN | 103671895 A | 3/2014 |

(Continued)

OTHER PUBLICATIONS

International Search Report issued in PCT/JP2017/011229; dated Jun. 6, 2017.
(Continued)

*Primary Examiner* — Huan Le
(74) *Attorney, Agent, or Firm* — Studebaker & Brackett PC

(57) ABSTRACT

A frictional engagement element includes: a first piston, a second piston, a first urging member for urging the first piston in a direction of releasing a friction plate, and a second urging member for urging the second piston in the direction of releasing the friction plate with an urging force
(Continued)

larger than the urging force of the first urging member. One of the first and second pistons has a communicating hole for connecting an engaging hydraulic chamber with an opposite hydraulic chamber and the other of the first and second pistons has a valve part for closing the communicating hole. The difference in travel distance between the first and second pistons in motion due to the different urging forces of the first and second urging members causes the valve part to open the communicating hole.

7 Claims, 9 Drawing Sheets

(52) U.S. Cl.
CPC ..... *F16H 61/0265* (2013.01); *F16H 63/3026* (2013.01); *F16H 61/686* (2013.01)

(56) References Cited

U.S. PATENT DOCUMENTS

| | | |
|---|---|---|
| 5,421,439 A | 6/1995 | Hayasaki |
| 2012/0247913 A1 | 10/2012 | Nakano et al. |
| 2014/0083810 A1 | 3/2014 | Hwang |
| 2015/0247537 A1 | 9/2015 | Park |
| 2017/0184160 A1 | 6/2017 | Yamamoto et al. |

FOREIGN PATENT DOCUMENTS

| | | |
|---|---|---|
| JP | S50-110828 U1 | 9/1975 |
| JP | H02-027024 U1 | 2/1990 |
| JP | H05-340430 A | 12/1993 |
| JP | H06265019 A | 9/1994 |
| JP | H10-131984 A | 5/1998 |
| JP | 2002257219 A | 9/2002 |
| JP | 2015-206390 A | 11/2015 |
| JP | 2016-001034 A | 1/2016 |
| KR | 20140020590 A | 2/2014 |

OTHER PUBLICATIONS

An Office Action mailed by the State Intellectual Property Office of the People's Republic of China dated Aug. 28, 2019, which corresponds to Chinese Patent Application No. 201780017992.0 and is related to U.S. Appl. No. 15/761,685; with English language summary.

Extended European Search Report issued by the European Patent Office dated Feb. 20, 2019, which corresponds to EP17774521.3-1012 and is related to U.S. Appl. No. 15/761,685.

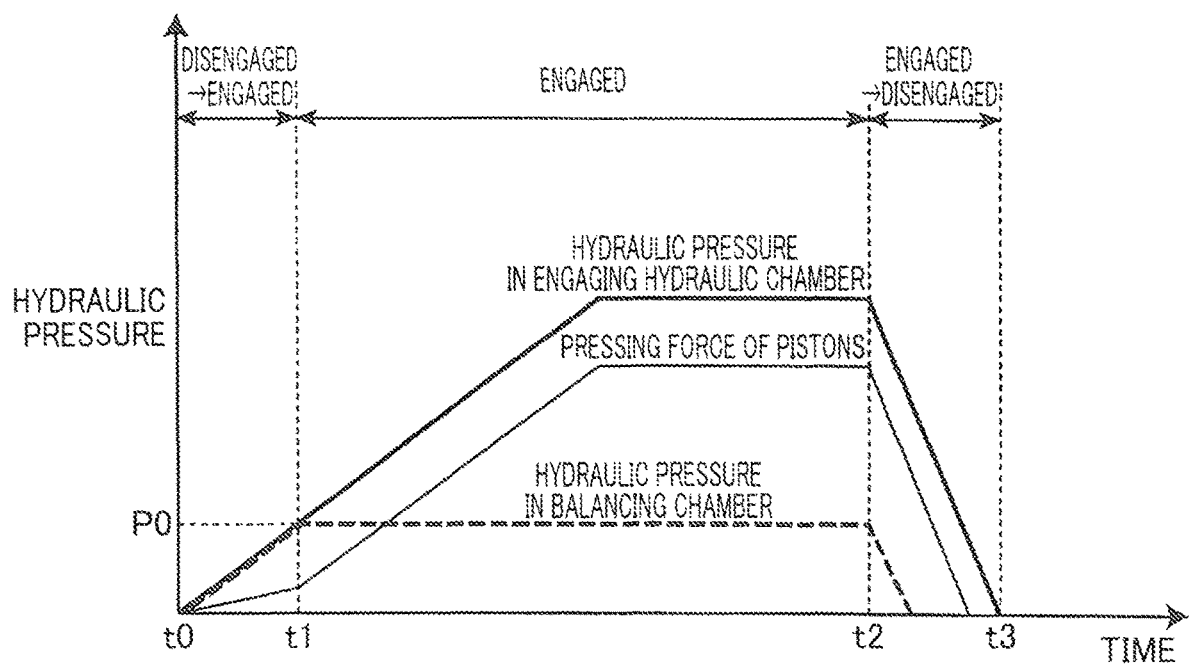

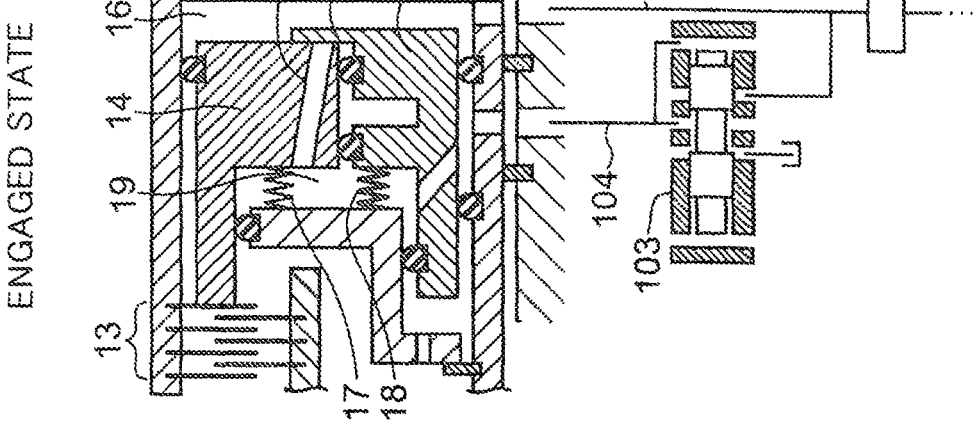
FIG.4A DISENGAGED STATE
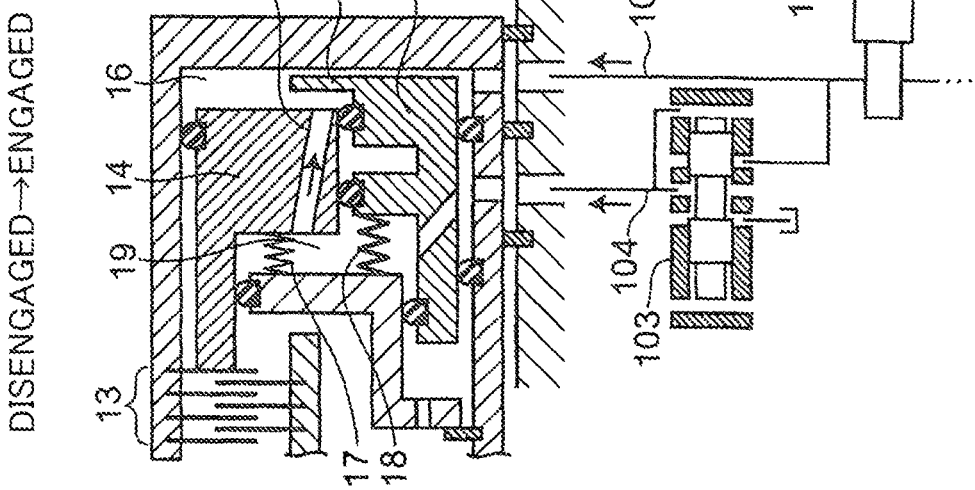
FIG.4B DISENGAGED→ENGAGED
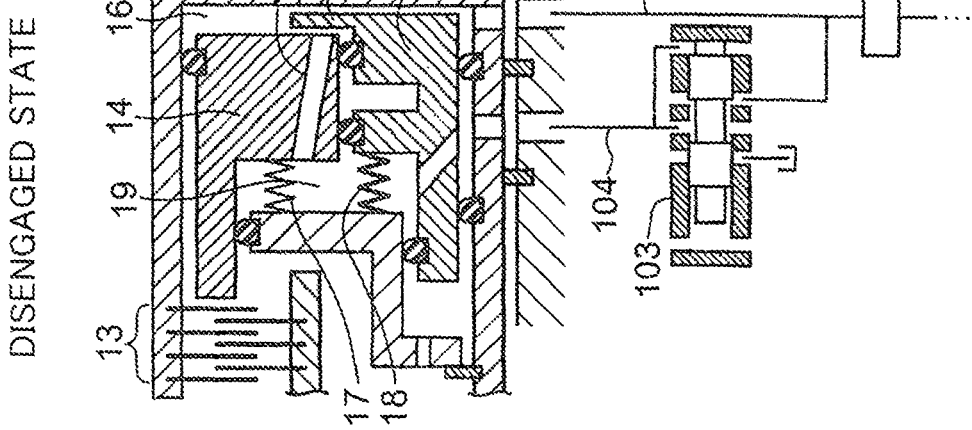
FIG.4C ENGAGED STATE

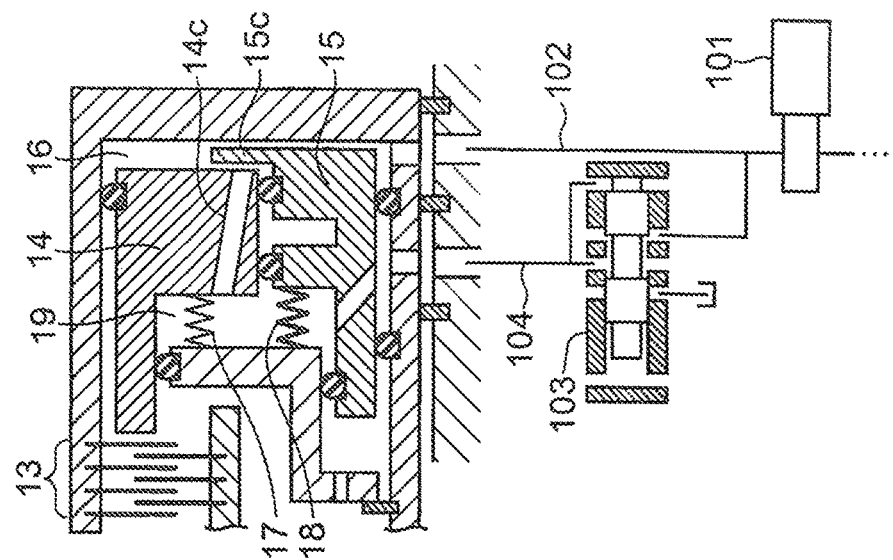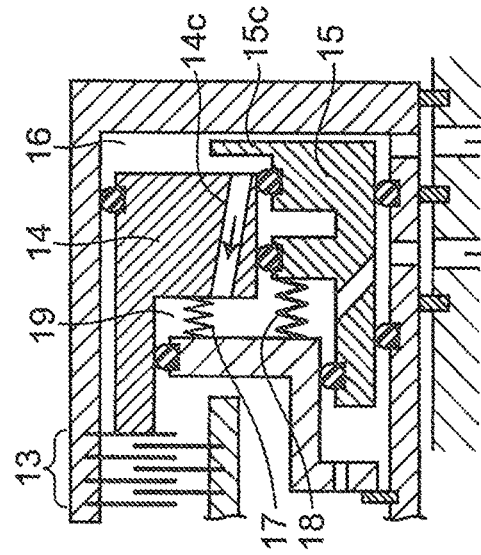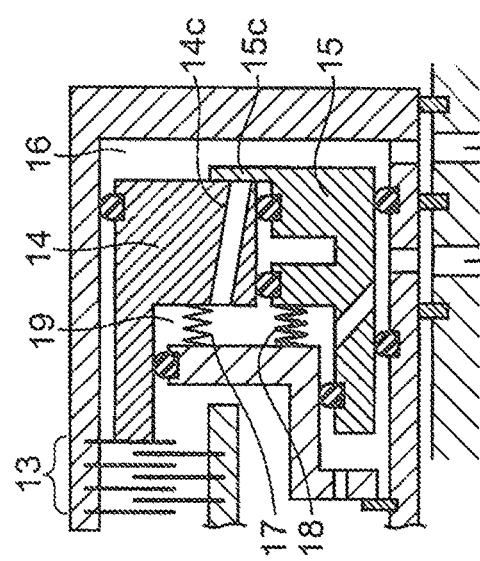

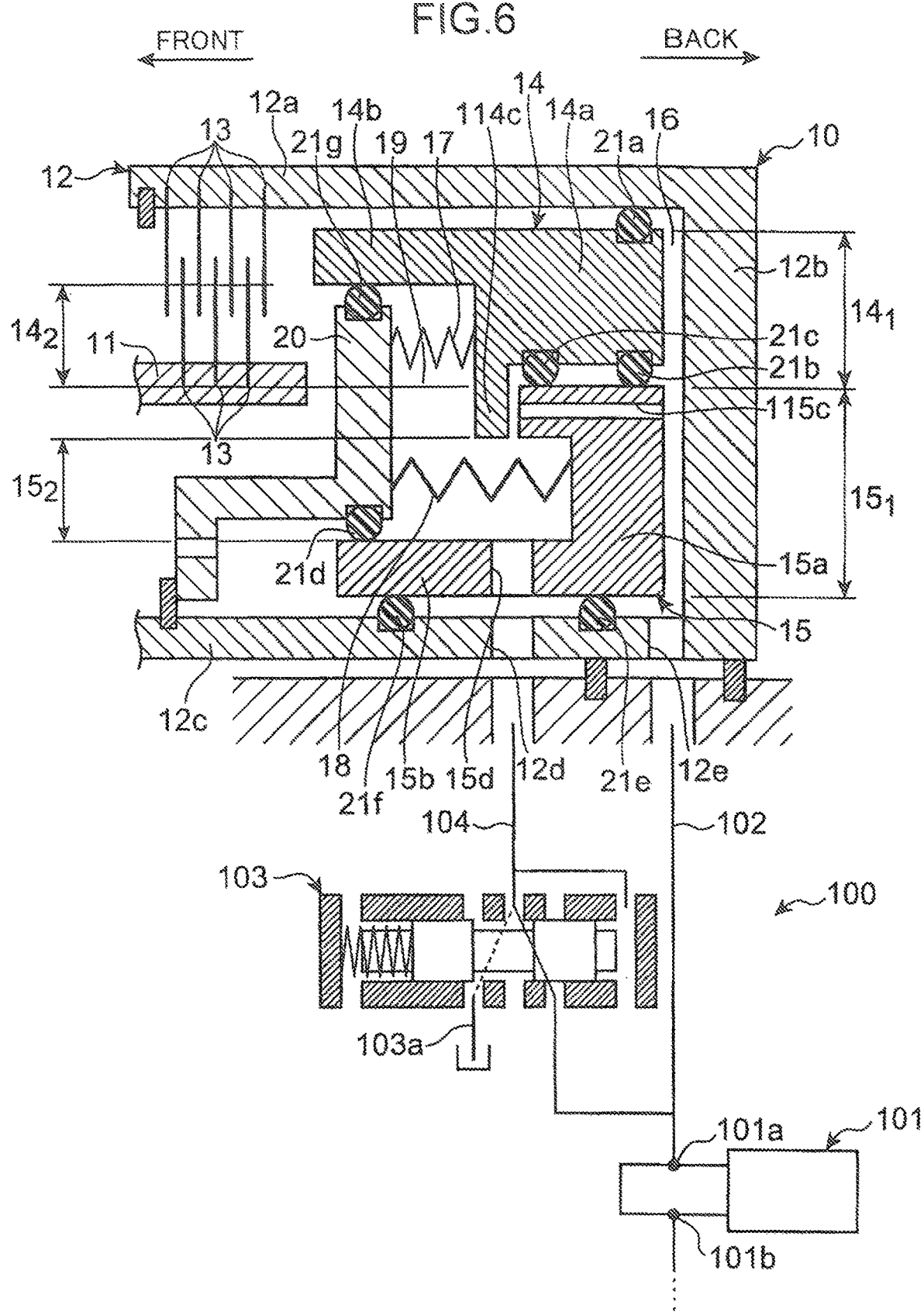

AUTOMATIC TRANSMISSION AND FRICTIONAL ENGAGEMENT ELEMENT

TECHNICAL FIELD

The present invention relates to an automatic transmission and a frictional engagement element for a vehicle to be controlled by hydraulic pressure.

BACKGROUND ART

An automatic transmission in a vehicle usually includes a plurality of planetary gear mechanisms and a plurality of frictional engagement elements such as a clutch and a brake. These frictional engagement elements are selectively engaged in order to switch power transmission paths for transmitting power from a driving source to wheels in a multistage transmission system.

Such a frictional engagement element includes: a plurality of friction plates disposed between two rotor elements (or between a rotor element and a stator element in the case of a brake), the friction plates being configured to alternately engage with the rotor elements; a piston for pressing the friction plates for engagement; and an engaging hydraulic chamber configured to be subject to a hydraulic pressure to move the piston. The hydraulic pressure in the hydraulic chamber is controlled by a hydraulic control mechanism for supplying or discharging hydraulic oil to or from the hydraulic chamber to achieve an appropriate hydraulic pressure. This engages or disengages the frictional engagement element.

In a clutch including a rotatable engaging hydraulic chamber, hydraulic oil remaining in the hydraulic chamber is subject to a centrifugal force, which may move the piston toward the friction plates (in the engagement direction) and cause a dragging resistance on the friction plates out of engagement while the clutch is disengaged. To prevent the dragging resistance on the friction plates, a centrifugally balancing chamber may be disposed opposite to the engaging hydraulic chamber with the piston therebetween. The centrifugally balancing chamber is subject to a hydraulic pressure to cancel the pressure caused by the centrifugal force.

In a clutch including such a centrifugally balancing chamber, it is necessary to keep a high clutch-engaging hydraulic pressure in the engaging hydraulic chamber by blocking an oil flow between the centrifugally balancing chamber and the engaging hydraulic chamber in order to keep the clutch engaged. While the clutch is disengaged, however, it is desirable to connect the two chambers with each other in order to equalize the hydraulic pressure in one chamber with the hydraulic pressure in the other chamber.

For example, as shown in FIG. 9, Patent Literature 1 discloses an automatic transmission including a frictional engagement element 200 having a centrifugally balancing chamber 203 disposed opposite to an engaging hydraulic chamber 202 with a piston 201 therebetween. The centrifugally balancing chamber 203 is connected with the engaging hydraulic chamber 202 via a ball valve 204. In this embodiment, while the clutch is engaged, the ball valve 204 blocks the oil flow from the engaging hydraulic chamber 202 to the centrifugally balancing chamber 203 to keep a high clutch-engaging pressure in the engaging hydraulic chamber 202. When the clutch is disengaged, the ball valve 204 allows the oil flow from the centrifugally balancing chamber 203 to the engaging hydraulic chamber 202 to equalize the hydraulic pressure in the chamber 202 with the hydraulic pressure in the chamber 203.

To improve the comfortability of a vehicle including a multistage automatic transmission at the time of gear change, it is required to shorten a transmission time, that is, a time for engaging the frictional engagement element (a switch time for engagement) or a time for disengaging the frictional engagement element (a switch time for disengagement).

The embodiment of Patent Literature 1 shortens a switch time for engaging a clutch. In the process of engagement of a clutch, the piston starts to move decreasing the volume of the hydraulic oil in the centrifugally balancing chamber, the hydraulic oil in which moves the ball valve. The open ball valve allows the oil flow from the centrifugally balancing chamber to the engaging hydraulic chamber. This facilitates the supply of hydraulic oil to the engaging hydraulic chamber to shorten a switch time for engaging the clutch.

In the process of disengagement of the clutch, however, the ball valve is kept closed for a while after the start of a movement of the piston because of a high hydraulic pressure in the engaging hydraulic chamber and a decreased volume of the engaging hydraulic chamber due to the movement of the piston. The closed ball valve blocks the oil flow from the engaging hydraulic chamber to the centrifugally balancing chamber. The hydraulic oil in the engaging hydraulic chamber is discharged only by a hydraulic control mechanism. This embodiment thus cannot shorten a time for discharging hydraulic oil, that is, a switch time for disengaging the clutch. Since the embodiment cannot shorten a switch time for disengagement (although it can shorten a switch time for engagement), the embodiment cannot shorten a transmission time for gear change involving engaging a clutch while disengaging another.

The delay in the discharge of hydraulic oil from the engaging hydraulic chamber in the process of disengagement using the ball valve occurs not only in a clutch in which the hydraulic oil in the engaging hydraulic chamber is subject to a centrifugal force but also in a brake in which a discharging hydraulic chamber, which is subject to a discharging hydraulic pressure, is disposed opposite to an engaging hydraulic chamber with a piston therebetween.

CITATION LIST

Patent Literature

Patent Literature 1: Japanese Patent Application No. 10-131984

SUMMARY OF INVENTION

An object of the present invention is to provide: a frictional engagement element including an engaging hydraulic chamber, and an opposite hydraulic chamber such as a centrifugally balancing chamber and a discharging hydraulic chamber, the opposite hydraulic chamber being disposed opposite to the engaging hydraulic chamber with a piston therebetween; or an automatic transmission including the frictional engagement element. The frictional engagement element or the automatic transmission facilitates the discharge of hydraulic oil from the engaging hydraulic chamber to shorten a switch time for disengaging the frictional engagement element in the process of disengagement of the frictional element.

To achieve the above object, the present invention provides a frictional engagement element or an automatic transmission including the frictional engagement element. The frictional engagement element includes: a first piston and a second piston each having a first face and a second face opposite to each other in an axial direction, the first and second pistons being movable in the axial direction; a plurality of friction plates disposed near the second faces of the first and second pistons; an engaging hydraulic chamber defined by the first faces of the first and second pistons, the engaging hydraulic chamber being configured to be subject to a hydraulic pressure to move the first and second pistons in a direction of pressing the friction plates; an opposite hydraulic chamber defined by the second faces of the first and second pistons, the opposite hydraulic chamber being configured to be subject to a hydraulic pressure to move the first and second pistons in a direction of releasing the friction plates; a first urging member for urging the first piston in the direction of releasing the friction plates; and a second urging member for urging the second piston in the direction of releasing the friction plates with an urging force larger than the urging force of the first urging member. One of the first and second pistons has a communicating hole for connecting the engaging hydraulic chamber with the opposite hydraulic chamber and the other of the first and second pistons has a valve part for closing the communicating hole. The first and second urging members have different urging forces so that a difference in travel distance between the first and second pistons in motion due to the different urging forces of the first and second urging members causes the valve part to open the communicating hole.

The present invention facilitates the discharge of hydraulic oil from the engaging hydraulic chamber to shorten a switch time for disengaging the frictional engagement element in the process of disengagement of the frictional element.

BRIEF DESCRIPTION OF DRAWINGS

FIG. 3 is a time chart showing a variation in a hydraulic pressure applied to each chamber in the frictional engagement element.

FIG. 4 shows a process of engagement of the frictional engagement element from a disengaged state to an engaged state.

FIG. 5 shows a process of disengagement of the frictional engagement element from an engaged state to a disengaged state.

FIG. 6 is a cross-sectional view of a frictional engagement element of an automatic transmission according to a second embodiment of the present invention.

DESCRIPTION OF EMBODIMENTS

With reference to the accompanying drawings, embodiments of the present invention will now be described.

First Embodiment

According to a first embodiment of the present invention, an automatic transmission 1 includes a plurality of planetary gear mechanisms and a plurality of frictional engagement elements such as a clutch and a brake. These frictional engagement elements are selectively engaged in order to switch power transmission paths for transmitting power from a driving source to wheels in a multistage transmission system.

Figure 1:
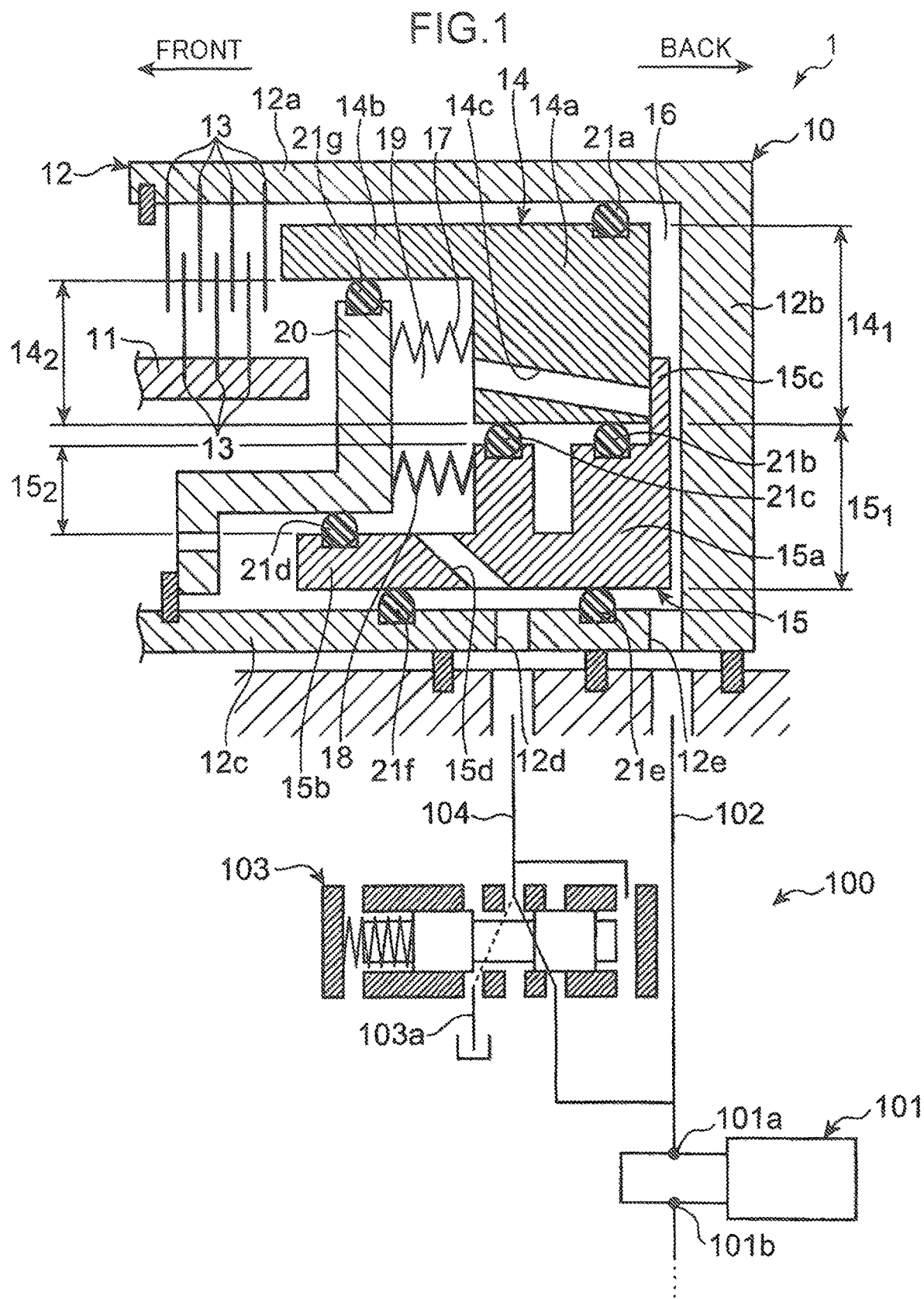
FIG. 1 is a cross-sectional view of a frictional engagement element of an automatic transmission according to a first embodiment of the present invention.

FIG. 1 is a cross-sectional view of a clutch 10 of the automatic transmission 1. As shown in FIG. 1, the clutch 10 includes: a hub 11 and a drum 12 disposed concentrically; a plurality of friction plates 13 disposed between the hub 11 and the drum 12 and alternately engaged with the hub 11 and the drum 12; a first piston 14 and a second piston 15, the first and second pistons 14 and 15 being movable in an axial direction; an engaging hydraulic chamber 16 configured to be subject to a hydraulic pressure to move the first and second pistons 14 and 15 in a direction of pressing the friction plates 13 (in the leftward direction in FIG. 1); and a centrifugally balancing chamber 19 (an opposite hydraulic chamber) configured to be subject to a hydraulic pressure to move the first and second pistons 14 and 15 in a direction of releasing the friction plates 13 (in the rightward direction in FIG. 1). In the following, the left side is defined as the forward side and the right side is defined as the backward side in FIG. 1. In other words, the axial direction of the pistons 14 and 15 toward the friction plates 13 is defined as the forward direction and the opposite axial direction is defined as the backward direction.

The drum 12 includes an outer cylinder part 12a extending in the axial direction, a bottom part 12b extending inward from the rear end of the outer cylinder part 12a in a radial direction, and an inner cylinder part 12c extending forward from the inner circumferential edge of the bottom part 12b in the axial direction. The outer cylinder part 12a, the bottom part 12b, and the inner cylinder part 12c are formed integrally. The friction plates 13 are engaged in the inner surface of the outer cylinder part 12a. The inner cylinder part 12c of the drum 12 is provided with an oil passage 12d for supplying balancing hydraulic oil from a second oil passage 104 of a hydraulic control mechanism 100 (described below) to the centrifugally balancing chamber 19, and an oil passage 12e for supplying engaging hydraulic oil from a first oil passage 102 of the hydraulic control mechanism 100 to the engaging hydraulic chamber 16.

The first piston 14 includes an annular hydraulic pressure receiving part 14a for receiving the hydraulic pressures in the engaging hydraulic chamber 16 and the centrifugally balancing chamber 19; and a cylindrical pressing part 14b for pressing the friction plates 13, the pressing part 14b extending forward from the hydraulic pressure receiving part 14a in the axial direction. The hydraulic pressure receiving part 14a and the pressing part 14b are formed integrally. The first piston 14 is supported in the drum 12 and can axially move in the drum 12. The hydraulic pressure receiving part 14a and the pressing part 14b are surrounded by the inner surface of the outer cylinder part 12a of the drum 12 and can axially slide with respect to the outer cylinder part 12a. An annular sealing member 21a is disposed between the outer cylinder part 12a of the drum 12 and the first piston 14.

The hydraulic pressure receiving part 14a of the first piston 14 has a first face $14_1$ on its rear side and a second face $14_2$ on its forward side. The first face $14_1$ receives the hydraulic pressure in the engaging hydraulic chamber 16 and the second face $14_2$ receives the hydraulic pressure in the centrifugally balancing chamber 19. The first face $14_1$ has a larger pressure receiving area than the second face $14_2$.

The hydraulic pressure receiving part 14a of the first piston 14 has a communicating hole 14c for connecting the engaging hydraulic chamber 16 with the centrifugally balancing chamber 19. The communicating hole 14c extends in the hydraulic pressure receiving part 14a generally in the axial direction and its respective ends are open in the first face $14_1$ and the second face $14_2$.

The second piston 15 includes an annular hydraulic pressure receiving part 15a for receiving the hydraulic pressures in the engaging hydraulic chamber 16 and the centrifugally balancing chamber 19; a cylindrical pressing part 15b for pressing the friction plates 13 via the first piston 14, the pressing part 15b extending forward from the hydraulic pressure receiving part 15a in the axial direction; and a valve part 15c for opening or closing the communicating hole 14c in the first piston 14, the valve part 15c extending outward from the hydraulic pressure receiving part 15a in the radial direction. The hydraulic pressure receiving part 15a, the pressing part 15b, and the valve part 15c are formed integrally. The second piston 15 is supported in the drum 12 and can axially move in the drum 12. The hydraulic pressure receiving part 15a and the pressing part 15b surround the outer surface of the inner cylinder part 12c of the drum 12 and can axially slide with respect to the inner cylinder part 12c. Annular sealing members 21e and 21f are disposed between the inner cylinder part 12c of the drum 12 and the second piston 15. The hydraulic pressure receiving part 15a of the second piston 15 is surrounded by the inner surface of the hydraulic pressure receiving part 14a of the first piston 14, and can axially slide with respect to the hydraulic pressure receiving part 14a. Annular sealing members 21b and 21c are disposed between the hydraulic pressure receiving part 15a and the hydraulic pressure receiving part 14a. The pressing part 15b is provided with an oil passage 15d for supplying balancing hydraulic oil from the second oil passage 104 of the hydraulic control mechanism 100 (described below) to the centrifugally balancing chamber 19.

The hydraulic pressure receiving part 15a of the second piston 15 has a first face $15_1$ on its rear side and a second face $15_2$ on its forward side. The first face $15_1$ receives the hydraulic pressure in the engaging hydraulic chamber 16 and the second face $15_2$ receives the hydraulic pressure in the centrifugally balancing chamber 19. The first face $15_1$ has a larger pressure receiving area than the second face $15_2$.

The valve part 15c extends outward from a portion of the circumference of the hydraulic pressure receiving part 15a in the radial direction to close at least the communicating hole 14c in the first piston 14. The valve part 15c can come into contact with or go out of contact with the rear side of the hydraulic pressure receiving part 14a of the first piston 14. When the second piston 15 moves forward with the valve part 15c closing the communicating hole 14c, the valve part 15c moves the first piston 14 forward in contact with the hydraulic pressure receiving part 14a of the first piston 14.

To prevent the rotation of the second piston 15 with respect to the first piston 14, a rotation stopper (not shown) may be disposed between the first piston 14 and the second piston 15, if necessary. The rotation stopper prevents the rotation of the second piston 15 with respect to the first piston 14; otherwise the valve portion 15c, which extends outward from only a portion of the circumference of the hydraulic pressure receiving part 15a to close the communicating hole 14c, may fail to close the communicating hole 14c. To prevent an oil leakage around an opening of the communicating hole 14c, a sealing member (not shown) may be disposed between the valve part 15c of the second piston 15 and the first piston 14 having the communicating hole 14c.

The engaging hydraulic chamber 16 is defined by the rear sides of the first and second pistons 14 and 15, that is, the first face $14_1$ of the hydraulic pressure receiving part 14a of the first piston 14 and the first face $15_1$ of the hydraulic pressure receiving part 15a of the second piston 15; and the bottom part 12b of the drum 12, the bottom part 12b facing the first faces 14i and $15_1$. When a predetermined engaging hydraulic pressure is applied to the engaging hydraulic chamber 16, the first and second pistons 14 and 15 press the friction plates 13 forward to engage the clutch 10.

The clutch 10 further includes a plate member 20 disposed in front of the first and second pistons 14 and 15. The plate member 20 is fixed to the drum 12. A sealing member 21g is disposed on the outer circumferential edge of the plate member 20 to seal the gap between the cylindrical part 14b of the first piston 14 and the plate member 20. An annular sealing member 21d is also disposed between the cylindrical part 15b of the second piston 15 and the plate member 20.

The centrifugally balancing chamber 19 is defined by the plate member 20 and the first and second pistons 14 and 15. When the centrifugally balancing chamber 19 is filled with hydraulic oil, a centrifugal force on the hydraulic oil in the centrifugally balancing chamber 19 cancels a centrifugal force on the hydraulic oil in the engaging hydraulic chamber 16. This prevents the first piston 14 from moving forward (in the direction of pressing the friction plates 13) while the clutch 10 is disengaged.

The clutch 10 includes a first compression spring 17 and a second compression spring 18 in the centrifugally balancing chamber 19. The first compression spring 17 (a first urging member) is disposed between the hydraulic pressure receiving part 14a of the first piston 14 and the plate member 20 and urges the first piston 14 backward (in the direction of releasing the friction plates 13). The second compression spring 18 (a second urging member) is disposed between the hydraulic pressure receiving part 15a of the second piston 15 and the plate member 20 and urges the second piston 15 backward. The second compression spring 18 has a larger urging force than the first compression spring 17.

Figure 2:
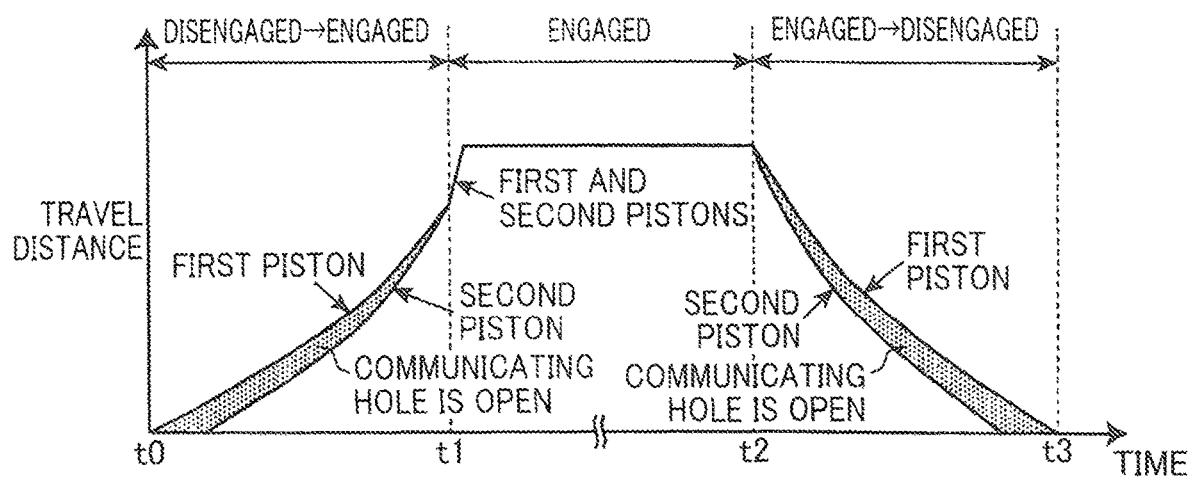
FIG. 2 is a time chart showing a variation in the travel distance of each piston of the frictional engagement element.

With reference to FIG. 2, operations of the first and second pistons 14 and 15 will now be described. FIG. 2 is a time chart showing variations in the travel distances of the first and second pistons 14 and 15 during the state transition of the clutch 10 from a disengaged state to an engaged state to a disengaged state.

As shown in FIG. 2, when the clutch 10 is in a disengaged state at a time t0, the first and second pistons 14 and 15 are at the initial positions (with zero travel distances). The communicating hole 14c is slightly open (the valve part 15c is slightly separated from the first piston 14) at this time, connecting the centrifugally balancing chamber 19 with the engaging hydraulic chamber 16. The open communicating hole 14c adjusts a difference in hydraulic pressure, if any, between the engaging hydraulic chamber 16 and the centrifugally balancing chamber 19 by allowing the oil flow between the two chambers, which equalizes the hydraulic pressure in the centrifugally balancing chamber 19 with the hydraulic pressure in the engaging hydraulic chamber 16. When the hydraulic pressures in the two chambers are equal to each other, the first and second pistons 14 and 15 are subject to forward pressures due to the difference between the pressure receiving areas on the side of the engaging hydraulic chamber 16 (the areas of the first faces 14$i$ and 15$i$) and the pressure receiving areas on the side of the centrifugally balancing chamber 19 (the areas of the second faces 14$_2$ and 15$_2$). The forward pressures are, however, smaller than the urging forces of the first and second compression springs 17 and 18 at the time t0, so that the first and second pistons 14 and 15 stay at the initial positions at this time.

In the process of engagement (from a disengaged state to an engaged state) of the clutch 10 from the time t0 to a time t1, the first and second pistons 14 and 15 move from the initial positions to the positions where the front end of the pressing part 14$b$ has zero (clutch) clearance with the friction plates 13 (the latter positions are referred to as "zero clearance positions" hereinafter). Between the starts of movements of the first and second pistons 14 and 15 from the initial positions, there is a time lag due to the different urging forces of the first and second compression springs 17 and 18. Specifically, since the urging force of the second compression spring 18 is larger than the urging force of the first compression spring 17, the first piston 14 first starts to move from the initial position, and then the second piston 15 starts to move from the initial position after a predetermined time lag. The time lag causes the first piston 14 to separate from the valve part 15$c$ of the second piston 15, which opens the communicating hole 14$c$. The difference in travel distance between the first and second pistons 14 and 15 gradually decreases as the pistons 14 and 15 come close to the zero clearance positions.

The first and second pistons 14 and 15 reach the zero clearance positions at the time t1. The difference in travel distance between the pistons 14 and 15 becomes zero at this time, when the valve part 15$c$ comes into contact with the first piston 14 and closes the communicating hole 14$c$ again.

Once the communicating hole 14$c$ is closed at the time t1, the hydraulic pressure in the engaging hydraulic chamber 16 starts to increase and the increased hydraulic pressure moves the first and second pistons 14 and 15 from the zero clearance positions to engagement completion positions in a short time. At the engagement completion positions, where the pistons 14 and 15 reach their maximum travel distances, the pistons 14 and 15 press the friction plates 13 at the maximum pressing force. The clutch 10 is thereby engaged and continues to be engaged until a time t2. While the clutch 10 is engaged (from the time t1 to the time t2), the valve part 15$c$ is in contact with the first piston 14 closing the communicating hole 14$c$.

In the process of disengagement (from an engaged state to a disengaged state) of the clutch 10 from the time t2 to a time t3, the first and second pistons 14 and 15 move from the engagement completion positions to the initial positions. Between the starts of movements of the first and second pistons 14 and 15 from the engagement completion positions, there is a time lag due to the different urging forces of the first and second compression springs 17 and 18. Specifically, since the urging force of the second compression spring 18 is larger than the urging force of the first compression spring 17, the second piston 15 first starts to move from the engagement completion position, and then the first piston 14 starts to move from the engagement completion position after a predetermined time lag. The second piston 15 first reaches the initial position, and then the first piston 14 reaches the initial position a little behind. The time lag causes the first piston 14 to separate from the valve part 15$c$ of the second piston 15, which opens the communicating hole 14$c$. The difference in travel distance between the first and second pistons 14 and 15 gradually increases as the second piston 15 comes close to the initial position, and the difference gradually decreases after the arrival of the second piston 15 at the initial position.

By the time t3, when the clutch 10 is in a disengaged state, both the first and second pistons 14 and 15 have reached the initial positions. The communicating hole 14$c$ is slightly open (the valve part 15$c$ is slightly separated from the first piston 14) at this time, as at the time t0, connecting the centrifugally balancing chamber 19 with the engaging hydraulic chamber 16.

The clutch 10 with the above structure is engaged or disengaged by the hydraulic control mechanism 100 for supplying or discharging hydraulic oil into or from the engaging hydraulic chamber 16 and the centrifugally balancing chamber 19 to control the hydraulic pressures in these chambers.

The hydraulic control mechanism 100 includes a hydraulic control valve 101 or a solenoid valve, the first oil passage 102, and the second oil passage 104. The hydraulic control valve 101 adjusts a line pressure of the hydraulic oil coming in through an input port 101$b$ to an engaging hydraulic pressure and supplies the hydraulic oil at the engaging hydraulic pressure through an output port 101$a$. The first oil passage 102 connects the output port 101$a$ of the hydraulic control valve 101 with the engaging hydraulic chamber 16, and the second oil passage 104 connects the output port 101$a$ with the centrifugally balancing chamber 19 via a reducing valve 103.

The reducing valve 103 can automatically adjusts a hydraulic pressure at its entrance and a hydraulic pressure at its exit or a drain port 103$a$ by moving its spool to a position for equalizing the urging force of its spring with the hydraulic pressure at the side closer to the centrifugally balancing chamber 19 (the secondary side). The reducing valve 103 applies a balancing hydraulic pressure at a predetermined reduced pressure to the centrifugally balancing chamber 19.

With reference to FIG. 3, an operation of the hydraulic control mechanism 100 will now be described. FIG. 3 is a time chart showing variations in the hydraulic pressures applied to the engaging hydraulic chamber 16 and the centrifugally balancing chamber 19, and a variation in the pressing force of the first and second pistons 14 and 15.

As shown in FIG. 3, in the process of engagement (from a disengaged state to an engaged state) of the clutch 10 from the time t0 to the time t1, the hydraulic control mechanism 100 continues to increase an equal hydraulic pressure applied to the engaging hydraulic chamber 16 and the centrifugally balancing chamber 19. Accordingly, the hydraulic pressures in the engaging hydraulic chamber 16 and the centrifugally balancing chamber 19 gradually increase to a predetermined balancing hydraulic pressure P0. As the hydraulic pressures in the engaging hydraulic chamber 16 and the centrifugally balancing chamber 19 increase, the pressing force of the first and second pistons 14 and 15 gradually increases.

When the hydraulic pressures in the engaging hydraulic chamber 16 and the centrifugally balancing chamber 19 reach the predetermined balancing hydraulic pressure P0 at the time t1, a substantial engagement of the clutch 10 starts.

While the clutch 10 is engaged from the time t1 to the time t2, the hydraulic control mechanism 100 still continues to apply a hydraulic pressure to the engaging hydraulic chamber 16 and the centrifugally balancing chamber 19. The hydraulic pressure in the engaging hydraulic chamber 16 continues to gradually increase to a predetermined engaging hydraulic pressure, while the hydraulic pressure in the centrifugally balancing chamber 19 is kept at the predetermined balancing hydraulic pressure P0 by the reducing valve 103. As the hydraulic pressure in the engaging hydraulic chamber 16 increases, the pressing force of the pistons gradually increases. After a while, the hydraulic pressure in the engaging hydraulic chamber 16 stops increasing and is kept at the predetermined engaging hydraulic pressure, and the pressing force of the pistons is also kept at a predetermined pressing force.

In the process of disengagement (from an engaged state to a disengaged state) of the clutch 10 from the time t2 to the time t3, the hydraulic control mechanism 100 gradually decreases a hydraulic pressure applied to the engaging hydraulic chamber 16 and the centrifugally balancing chamber 19 until the hydraulic pressures in the engaging hydraulic chamber 16 and the centrifugally balancing chamber 19 become zero. As the hydraulic pressures in the engaging hydraulic chamber 16 and the centrifugally balancing chamber 19 decrease, the pressing force of the first and second pistons 14 and 15 gradually decreases.

By the time t3, when the clutch 10 is in a disengaged state, the hydraulic pressures in the engaging hydraulic chamber 16 and the centrifugally balancing chamber 19 have become zero and the pressing force of the pistons has also become zero.

With reference to charts (a) to (c) in FIG. 4 and charts (a) to (c) in FIG. 5, an operation of the clutch 10 will now be described. FIG. 4 shows the process of engagement of the clutch 10 from a disengaged state to an engaged state, and FIG. 5 shows the process of disengagement of the clutch 10 from an engaged state to a disengaged state.

As shown in chart (a) in FIG. 4, when no hydraulic pressure is applied to the engaging hydraulic chamber 16 and the centrifugally balancing chamber 19, the first and second pistons 14 and 15, which are urged backward (in the direction away from the friction plates 13) by the first and second compression springs 17 and 18, are at the initial positions farthest from the friction plates 13 (at the positions with zero travel distances). The friction plates 13 are thus free from the pressing force of the first and second pistons 14 and 15, and the clutch 10 is in a disengaged state. At this time, the valve part 15c is slightly separated from the first piston 14 opening the communicating hole 14c. The open communicating hole 14c connects the centrifugally balancing chamber 19 with the engaging hydraulic chamber 16, which equalizes the hydraulic pressure in the centrifugally balancing chamber 19 with the hydraulic pressure in the engaging hydraulic chamber 16 (see the time t0 in FIGS. 2 and 3, if necessary).

As shown in chart (b) in FIG. 4, the hydraulic pressures in the engaging hydraulic chamber 16 and the centrifugally balancing chamber 19 are increased. Since the pressure receiving areas of the first faces 141 and 151 of the first and second pistons 14 and 15 are larger than the pressure receiving areas of the second faces 142 and 152, the first and second pistons 14 and 15 are moved forward (in the direction toward the friction plates 13). This means that the clutch 10 starts to change its state from a disengaged state to an engaged state. Since the urging force of the second compression spring 18 is larger than the urging force of the first compression spring 17, the first piston 14 first starts to move forward, due to the different urging forces, to come close to the zero clearance position (the position where the clutch clearance is substantially zero but the friction plates 13 is not subject to the pressing force of the pistons yet). The movement of the first piston 14 away from the valve part 15c of the second piston 15 opens the communicating hole 14c, and the open communicating hole 14c allows the oil flow from the centrifugally balancing chamber 19 to the engaging hydraulic chamber 16 (see the period from the time t0 to the time t1 in FIGS. 2 and 3, if necessary).

As shown in chart (c) in FIG. 4, when a further hydraulic pressure is applied to the engaging hydraulic chamber 16 and the centrifugally balancing chamber 19, the second piston 15 starts to move forward against the urging force of the second compression spring 18, and both the first and second pistons 14 and 15 reach the zero clearance positions. The valve part 15c of the second piston 15 closes the communicating hole 14c in the first piston 14 at this time, and the closed communicating hole 14c blocks the oil flow from the engaging hydraulic chamber 16 to the centrifugally balancing chamber 19. Accordingly, the hydraulic pressure in the engaging hydraulic chamber 16 increases, and the increased hydraulic pressure further moves the first and second pistons 14 and 15. The first and second pistons 14 and 15 then presses the friction plates 13 to engage the clutch 10 (see the period from the time t1 to the time t2 in FIGS. 2 and 3, if necessary).

Chart (a) in FIG. 5 shows the state in which a predetermined engaging hydraulic pressure is applied to the engaging hydraulic chamber 16 and a predetermined balancing hydraulic pressure is applied to the centrifugally balancing chamber 19. Under this condition, the first and second pistons 14 and 15 are pressed forward against the urging forces of the first and second compression springs 17 and 18 (see the time t2 in FIG. 2). The first and second pistons 14 and 15 pressing the friction plates 13 keep the clutch 10 engaged (see the time t2 in FIGS. 2 and 3, if necessary).

As shown in chart (b) in FIG. 5, when the hydraulic pressures in the engaging hydraulic chamber 16 and the centrifugally balancing chamber 19 are decreased, the first and second pistons 14 and 15 are urged backward by the urging forces of the first and second compression springs 17 and 18. This means that the clutch 10 starts to change its state from an engaged state to a disengaged state. Since the urging force of the second compression spring 18 is larger than the urging force of the first compression spring 17, the second piston 15 first starts to move backward due to the different urging forces. At this time, the valve part 15c of the second piston 15 moves away from the first piston 14 opening the communicating hole 14c, and the open communicating hole 14c allows the oil flow from the engaging hydraulic chamber 16 to the centrifugally balancing chamber 19 (see the period from the time t2 to the time t3 in FIGS. 2 and 3, if necessary).

The first piston 14 then starts to move backward against the urging force of the first compression spring 17. As shown in chart (c) in FIG. 5, by the time the hydraulic pressures in the engaging hydraulic chamber 16 and the centrifugally balancing chamber 19 are decreased to the point where no hydraulic pressure is applied to these chambers, both the first and second pistons 14 and 15 have reached the initial positions to complete the process of disengagement of the clutch 10. At this time, the valve part 15c of the second piston 15 is slightly separated from the first piston 14 opening the communicating hole 14c. The open communicating hole 14c connects the centrifugally balancing chamber 19 with the engaging hydraulic chamber 16, which equalizes the hydraulic pressure in the centrifugally balancing chamber 19 with the hydraulic pressure in the engaging hydraulic chamber 16 (see the time t3 in FIGS. 2 and 3, if necessary).

As described above, according to the first embodiment, in the clutch 10 having the engaging hydraulic chamber 16 opposite to the centrifugally balancing chamber 19 with the pistons 14 and 15 therebetween, and in the automatic transmission 1 including the clutch 10; the first piston 14 has the communicating hole 14c for connecting the engaging hydraulic chamber 16 with the centrifugally balancing chamber 19, the second piston 15 has the valve part 15c for closing the communicating hole 14c, and the first and second compression springs 17 and 18 have different urging forces so that the difference in travel distance between the first and second pistons 14 and 15 in motion due to the different urging forces of the first and second compression springs 17 and 18 causes the valve part 15c to open the communicating hole 14c. In the process of disengagement of the clutch 10, the second piston 15 first starts to move backward (in the direction of releasing the friction plates 13) as the hydraulic pressure in the engaging hydraulic chamber 16 decreases. For a short time after the start of the movement of the second piston 15, the second piston 15 moves away from the first piston 14 in the axial direction, which causes the valve part 15c to open the communicating hole 14c. The open communicating hole 14c allows the oil flow from the engaging hydraulic chamber 16 to the centrifugally balancing chamber 19. The hydraulic oil in the engaging hydraulic chamber 16 is discharged through the communicating hole 14c as well as by the hydraulic control mechanism 100. This shortens a time for discharging hydraulic oil, that is, a switch time for disengaging the clutch 10.

The first embodiment facilitates the discharge of hydraulic oil from the engaging hydraulic chamber 16 to shorten a switch time for disengaging the frictional element 10 in the process of disengagement of the clutch 10.

According to the first embodiment, the first and second compression springs 17 and 18 of the pistons 14 and 15 are disposed in the centrifugally balancing chamber 19. These compression springs are easier to be mounted than extension coil springs.

According to the first embodiment, the automatic transmission 1 further includes the hydraulic control mechanism 100 having the hydraulic control valve 101 for controlling the clutch 10, the first oil passage 102 for connecting the output port 101a of the hydraulic pressure valve 101 and the engaging hydraulic chamber 16, and the second oil passage 104 for connecting the output port 101a and the centrifugally balancing chamber 19. The single hydraulic control valve 101 efficiently supplies hydraulic oil to both the engaging hydraulic chamber 16 and the centrifugally balancing chamber 19 to achieve a necessary hydraulic pressure.

According to the first embodiment, the automatic transmission 1 further includes the reducing valve 103 on the second oil passage 104. The reducing valve 103 restricts the hydraulic pressure in the centrifugally balancing chamber 19 to a predetermined pressure. While the clutch 10 is engaged, the reducing valve 103 properly keeps the hydraulic pressure in the centrifugally balancing chamber 19 lower than the hydraulic pressure in the engaging hydraulic chamber 16 to ensure an engaging hydraulic pressure necessary for keeping the clutch 10 engaged.

According to the first embodiment, the first and second pistons 14 and 15 have the first faces $14_1$ and $15_1$ larger than the second faces $14_2$ and $15_2$ so that there is a difference in pressure receiving area between the first and second faces. Even when there is little difference in hydraulic pressure between the engaging hydraulic chamber 16 and the centrifugally balancing chamber 19, for example, in the case without the reducing valve 103 or when the reducing valve 103 has not yet achieved a substantial pressure reduction shortly after the start of control; the difference in pressure receiving area enables the first and second pistons 14 and 15 to move forward (in the direction of pressing the friction plates 13) against the first and second compression springs 17 and 18 in the process of engagement of the clutch 10.

Second Embodiment

FIG. 6 is a cross-sectional view of a frictional engagement element of an automatic transmission according to a second embodiment of the present invention. The second embodiment is different from the first embodiment in the position of the communicating hole for connecting the engaging hydraulic chamber with the centrifugally balancing chamber and the position of the valve part for opening or closing the communicating hole. The same reference numerals will be used for the same structural elements as the structural elements of the first embodiment, and detailed descriptions on those structural elements will be omitted.

According to the second embodiment, as shown in FIG. 6, the hydraulic pressure receiving part 15a of the second piston 15 has the communicating hole 115c for connecting the engaging hydraulic chamber 16 with the centrifugally balancing chamber 19. The valve part 114c for opening or closing the communicating hole 115c extends inward from the hydraulic pressure receiving part 14a of the first piston 14 in the radial direction. The valve part 114c is disposed in the centrifugally balancing chamber 19 and configured to close the opening at the forward side (the side closer to the friction plates 13) of the communicating hole 115c in the hydraulic pressure receiving part 15a.

According to the second embodiment, in the process of disengagement of the clutch, the second piston 15 first starts to move from the zero clearance position toward the initial position as the hydraulic pressure in the engaging hydraulic chamber 16 decreases, as in the first embodiment. For a short time after the start of the movement of the second piston 15, the second piston 15 moves away from the first piston 14 in the axial direction, which causes the valve part 114c to open the communicating hole 115c. The open communicating hole 115c allows the oil flow from the engaging hydraulic chamber 16 to the centrifugally balancing chamber 19. The hydraulic oil in the engaging hydraulic chamber 16 is discharged through the communicating hole 115c as well as by the hydraulic control mechanism 100. This shortens a time for discharging hydraulic oil from the engaging hydraulic chamber 16, that is, a switch time for disengaging the clutch 10. The second embodiment facilitates the discharge of hydraulic oil from the engaging hydraulic chamber 16 to shorten a switch time for disengaging the frictional element 10 in the process of disengagement of the clutch 10, as in the first embodiment.

Modified Embodiments

The present invention is not limited to the above illustrated embodiments, and can be improved or modified in design in various ways within the scope of the claims. Some of those modified embodiments will now be described.

Figure 7:
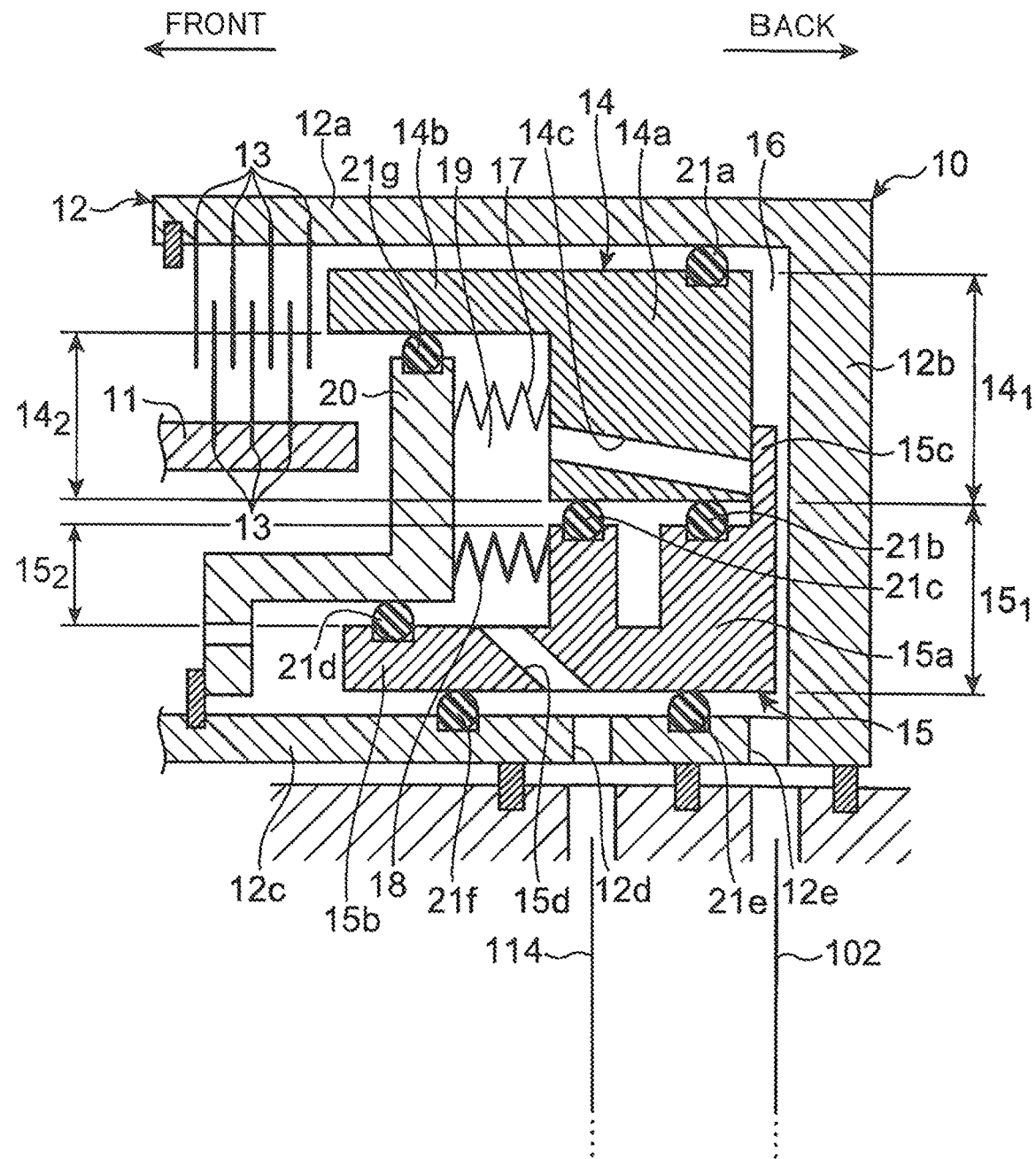
FIG. 7 is a cross-sectional view of a modified embodiment of the frictional engagement element.
Figure 8:
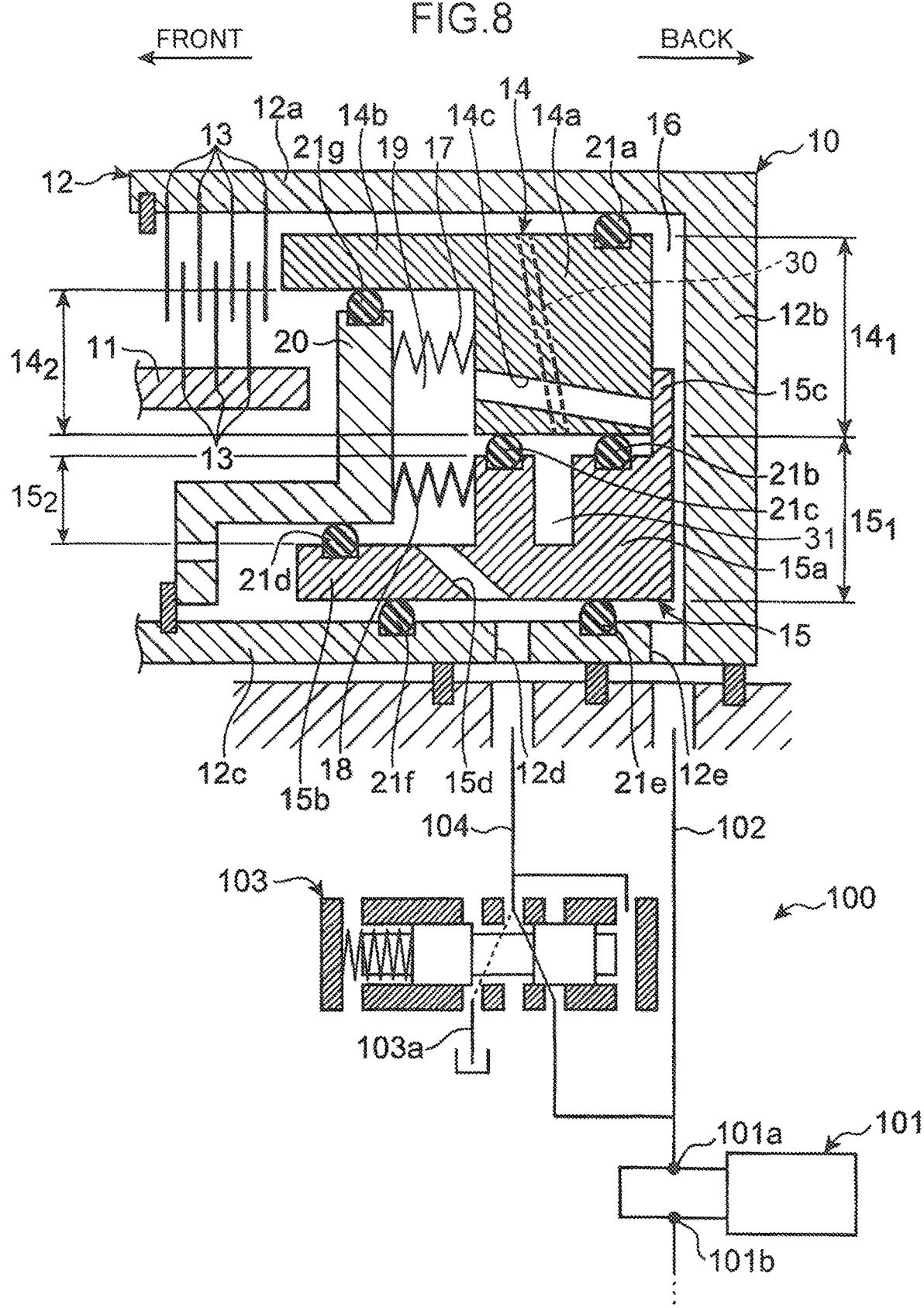
FIG. 8 is a cross-sectional view of another modified embodiment of the frictional engagement element.
Figure 9:
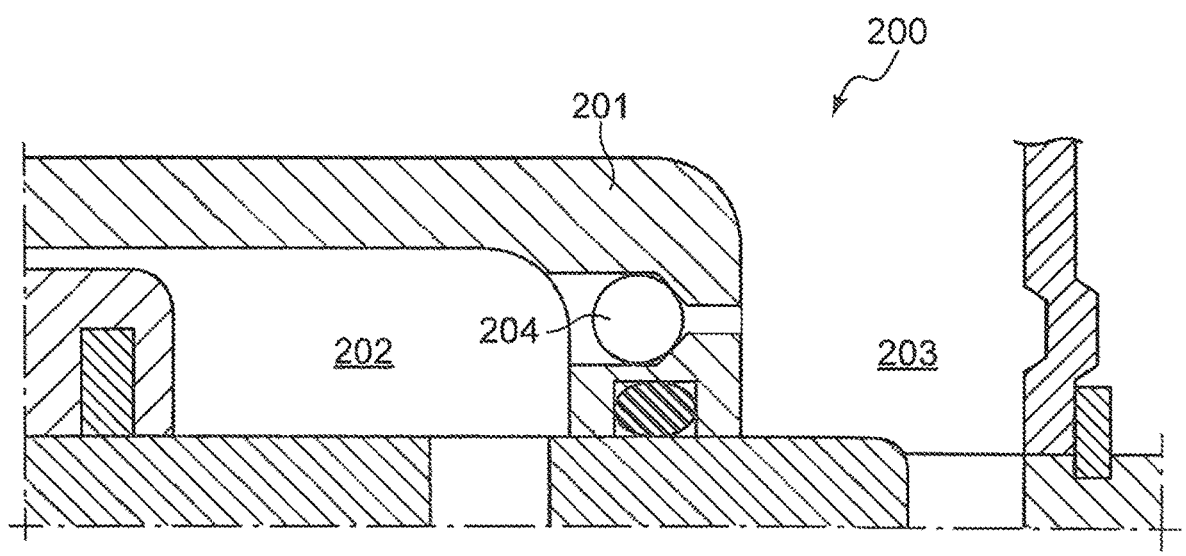
FIG. 9 is an enlarged cross-sectional view of a conventional frictional engagement element of an automatic transmission.

FIGS. 7 and 8 are cross-sectional views of modified embodiments of the frictional engagement element. The same reference numerals will be used for the same structural elements as the structural elements of the first embodiment, and detailed descriptions on those structural elements will be omitted.

As shown in FIG. 7, the centrifugally balancing chamber 19 may not be subject to a balancing hydraulic pressure generated by the hydraulic control mechanism 100, but may be supplied with some of lubricating oil for generating a balancing hydraulic pressure through a lubricating oil passage 114 for supplying the lubricating oil to gears, bearings and the like in the automatic transmission 1.

As shown in FIG. 8, the first piston 14 may have an air hole 30. The air hole 30 extends in the hydraulic pressure receiving part 14a of the first piston 14 in the radial direction. One end of the air hole 30 (the opening at the inner side) is connected with a space 31 defined by the first and second pistons 14 and 15, and the other end of the air hole 30 (the opening at the outer side) is connected with the space defined by the outer surface of the first piston 14 and the outer cylinder part 12a of the drum 12. The space 31 is isolated from the engaging hydraulic chamber 16 and the centrifugally balancing chamber 19 by sealing members 21b and 21c disposed between the first and second pistons 14 and 15.

According to the modified embodiment shown in FIG. 8, in case of the increase in the air pressure in the space 31, the air hole 30 leads some of the pressurized air to the outside space (the space between the first piston 14 and the outer cylinder part 12a), which prevents an undesirable air pressure increase in the space 31 in order to prevent the pressurized air in the space 31 from going through the gaps at the sealing members 21b and 21c (the small gaps between the sealing members 21b and 21c and their contact surfaces) into the engaging hydraulic chamber 16 or the centrifugally balancing chamber 19. Especially when the hydraulic pressure in the engaging hydraulic chamber 16 or the centrifugally balancing chamber 19 drops to zero with a high air pressure in the space 31, the air in the space 31 is more likely to go into the engaging hydraulic chamber 16 or the centrifugally balancing chamber 19. The modified embodiment shown in FIG. 8, in which the first piston 14 has the air hole 30 connected with the space 31, prevents the undesirable air invasion under the above condition that is likely to cause the air invasion. This improves responsiveness in increasing or decreasing the hydraulic pressures in the engaging hydraulic chamber 16 and the centrifugally balancing chamber 19, which enables an accurate drive control of the first and second pistons 14 and 15.

In the above modified embodiment (FIG. 8), the air hole 30 is formed in the first piston 14 in order to lead some of the air in the space 31 to a space other than the hydraulic chambers. For this purpose, the air hole may be formed in the second piston 15.

In addition to the modified embodiments shown in FIGS. 7 and 8, other modified embodiments can be contemplated.

For example, in the above embodiments, the frictional engagement element is the clutch 10, however, the frictional engagement element is not limited to this and may be a brake. When the frictional engagement element is a brake, parts of the friction plates are fixed not to the drum but to a transmission casing in a fixed position or the like, and the centrifugally balancing chamber 19 is replaced with a disengaging hydraulic pressure chamber.

In addition, the valve part 15c (114c) may be disposed at any position as long as the valve part 15c (114c) can cover the communicating hole 14c (115c). For example, in the case of a modified embodiment based the first embodiment, the valve part 15c may be provided all around the circumference of the hydraulic pressure receiving part 15a as well as protrude outward from a portion of the circumference of the hydraulic pressure receiving part 15a in the radial direction to close the communicating hole 14c. This is also the case for the valve part 114c in a modified embodiment based on the second embodiment.

<Summary of Embodiments>

The summary of the above embodiments will now be described.

The above embodiments relate to a frictional engagement element or an automatic transmission including the frictional engagement element. The frictional engagement element includes: a first piston and a second piston each having a first face and a second face opposite to each other in the axial direction, the first and second pistons being movable in an axial direction; a plurality of friction plates disposed near the second faces of the first and second pistons; an engaging hydraulic chamber defined by the first faces of the first and second pistons, the engaging hydraulic chamber being configured to be subject to a hydraulic pressure to move the first and second pistons in a direction of pressing the friction plates; an opposite hydraulic chamber defined by the second faces of the first and second pistons, the opposite hydraulic chamber being configured to be subject to a hydraulic pressure to move the first and second pistons in a direction of releasing the friction plates; a first urging member for urging the first piston in the direction of releasing the friction plates; and a second urging member for urging the second piston in the direction of releasing the friction plates with an urging force larger than the urging force of the first urging member. One of the first and second pistons has a communicating hole for connecting the engaging hydraulic chamber with the opposite hydraulic chamber and the other of the first and second pistons has a valve part for closing the communicating hole. The first and second urging members have different urging forces so that a difference in travel distance between the first and second pistons in motion due to the different urging forces of the first and second urging members causes the valve part to open the communicating hole.

In the frictional engagement element with this structure having the engaging hydraulic chamber opposite to the opposite hydraulic chamber with the pistons therebetween or an automatic transmission including the frictional engagement element, one of the first and second pistons has the communicating hole for connecting the engaging hydraulic chamber with the opposite hydraulic chamber, the other of the first and second pistons has the valve part for closing the communicating hole, and the first and second urging members have different urging forces so that the difference in travel distance between the first and second pistons in motion due to the different urging forces of the first and second urging members causes the valve part to open the communicating hole. In the process of disengagement of the frictional engagement element, the second piston first starts to move in the disengagement direction as the hydraulic pressure in the engaging hydraulic chamber decreases. The second piston moves away from the first piston in the axial direction, which causes the valve part to open the communicating hole. Accordingly, the hydraulic oil in the engaging hydraulic chamber is discharged through the communicating hole as well as by the hydraulic control mechanism. The embodiments facilitate the discharge of hydraulic oil from the engaging hydraulic chamber to shorten a switch time for disengaging the frictional engagement element in the process of disengagement of the frictional element.

The first and second urging members should preferably be disposed in the opposite hydraulic chamber.

The first and second urging members in the opposite hydraulic chamber may be compression urging members such as disc springs, leaf springs, and compression coil springs. These types of urging members are easier to be mounted than tension urging members such as extension coil springs.

The automatic transmission should preferably further include the hydraulic control mechanism. The hydraulic control mechanism includes: the hydraulic control valve for controlling the frictional engagement element; the first oil passage for connecting the output port of the hydraulic control valve with the engaging hydraulic chamber; and the second oil passage for connecting the output port with the opposite hydraulic chamber.

The single hydraulic control valve in this structure efficiently supply hydraulic oil to both the engaging hydraulic chamber and the opposite hydraulic chamber to achieve a necessary hydraulic pressure.

In the above structure, each of the first and second pistons should more preferably have the first face larger than the second face.

In an embodiment including the first and second pistons having different pressure receiving areas on the sides of the engaging hydraulic chamber and the centrifugally balancing chamber, even when there is little difference in hydraulic pressure between the two chambers, for example, in the case without the reducing valve or when the reducing valve has not yet achieved a substantial pressure reduction shortly after the start of control; the difference in pressure receiving area enables the first and second pistons to move against the first and second urging members in the process of engagement of the frictional engagement element.

In the above structure, the automatic transmission should more preferably further include the reducing valve on the second oil passage. The reducing valve restricts the hydraulic pressure in the opposite hydraulic chamber to a predetermined pressure.

While the frictional engagement element is engaged, the reducing valve properly keeps the hydraulic pressure in the opposite hydraulic chamber lower than the hydraulic pressure in the engaging hydraulic chamber to ensure an engaging hydraulic pressure necessary for keeping the frictional engagement element engaged.

It is preferable that a space is disposed between the first and second pistons, the space should be isolated from the engaging hydraulic chamber and the opposite hydraulic chamber, and an air hole extends in the first piston or in the second piston, the air hole should be configured to lead some of the air in the space to an outside space.

In case of the increase in the hydraulic pressure in the space, the air hole in the first piston or the second piston leads some of the pressurized air to the outside space, which prevents an undesirable air pressure increase in the space in order to prevent an undesirable air invasion into the engaging hydraulic chamber or the opposite hydraulic chamber.

INDUSTRIAL APPLICABILITY

As described above, the present invention relates to the frictional engagement element having the engaging hydraulic chamber opposite to the opposite hydraulic chamber (such as a centrifugally balancing chamber or a disengaging hydraulic chamber) with the pistons therebetween, and the automatic transmission including the frictional engagement element. In the process of disengagement of the frictional engagement element, the embodiments of the present invention facilitate the discharge of hydraulic oil from the engaging hydraulic chamber to shorten a switch time for disengaging the frictional element. The present invention is thus advantageously used in the technical field for manufacturing automatic transmissions including the frictional engagement elements and vehicles including the automatic transmissions.

The invention claimed is:

1. An automatic transmission comprising a frictional engagement element,
   the frictional engagement element including:
   a first piston and a second piston each having a first face and a second face opposite to each other in an axial direction, the first and second pistons being movable in the axial direction;
   a plurality of friction plates disposed near the second faces of the first and second pistons;
   an engaging hydraulic chamber defined by the first faces of the first and second pistons, the engaging hydraulic chamber being configured to be subject to a hydraulic pressure to move the first and second pistons in a direction of pressing the friction plates;
   an opposite hydraulic chamber defined by the second faces of the first and second pistons, the opposite hydraulic chamber being configured to be subject to a hydraulic pressure to move the first and second pistons in a direction of releasing the friction plates;
   a first urging member for urging the first piston in the direction of releasing the friction plates; and
   a second urging member for urging the second piston in the direction of releasing the friction plates with an urging force larger than an urging force of the first urging member,
   wherein one of the first and second pistons has a communicating hole for connecting the engaging hydraulic chamber with the opposite hydraulic chamber and the other of the first and second pistons has a valve part for closing the communicating hole,
   the first and second urging members have different urging forces so that, in a process of disengagement of the frictional engagement element a difference in travel distance between the first and second pistons in motion due to the different urging forces of the first and second urging members causes the valve part to open the communicating hole to make hydraulic oil flow from the engaging hydraulic chamber into the opposite hydraulic chamber through the communicating hole, and
   the first and second urging members have different urging forces so that, in a process of engagement of the frictional engagement element, a difference in travel distance between the first and second pistons in motion due to the different urging forces of the first and second urging members causes the valve part to open the communicating hole to make hydraulic oil flow from the opposite hydraulic chamber into the engaging hydraulic chamber through the communicating hole.

2. The automatic transmission according to claim 1, wherein
   the first and second urging members are disposed in the opposite hydraulic chamber.

3. An automatic transmission comprising a frictional engagement element,
   the frictional engagement element including:
   a first piston and a second piston each having a first face and a second face opposite to each other in an axial direction, the first and second pistons being movable in the axial direction;
   a plurality of friction plates disposed near the second faces of the first and second pistons;

an engaging hydraulic chamber defined by the first faces of the first and second pistons, the engaging hydraulic chamber being configured to be subject to a hydraulic pressure to move the first and second pistons in a direction of pressing the friction plates;
an opposite hydraulic chamber defined by the second faces of the first and second pistons, the opposite hydraulic chamber being configured to be subject to a hydraulic pressure to move the first and second pistons in a direction of releasing the friction plates;
a first urging member for urging the first piston in the direction of releasing the friction plates; and
a second urging member for urging the second piston in the direction of releasing the friction plates with an urging force larger than an urging force of the first urging member,
wherein one of the first and second pistons has a communicating hole for connecting the engaging hydraulic chamber with the opposite hydraulic chamber and the other of the first and second pistons has a valve part for closing the communicating hole, and
the first and second urging members have different urging forces so that a difference in travel distance between the first and second pistons in motion due to the different urging forces of the first and second urging members causes the valve part to open the communicating hole,
the automatic transmission further comprising a hydraulic control mechanism,
the hydraulic control mechanism including: a hydraulic control valve for controlling the frictional engagement element; a first oil passage for connecting an output port of the hydraulic control valve with the engaging hydraulic chamber; and a second oil passage for connecting the output port with the opposite hydraulic chamber.

4. The automatic transmission according to claim 3, wherein
each of the first and second pistons has the first face larger than the second face.

5. The automatic transmission according to claim 3,
the automatic transmission further comprising a reducing valve on the second oil passage, the reducing valve being configured to restrict the hydraulic pressure in the opposite hydraulic chamber to a predetermined pressure.

6. An automatic transmission comprising a frictional engagement element,
the frictional engagement element including:
a first piston and a second piston each having a first face and a second face opposite to each other in an axial direction, the first and second pistons being movable in the axial direction;
a plurality of friction plates disposed near the second faces of the first and second pistons;
an engaging hydraulic chamber defined by the first faces of the first and second pistons, the engaging hydraulic chamber being configured to be subject to a hydraulic pressure to move the first and second pistons in a direction of pressing the friction plates;
an opposite hydraulic chamber defined by the second faces of the first and second pistons, the opposite hydraulic chamber being configured to be subject to a hydraulic pressure to move the first and second pistons in a direction of releasing the friction plates;
a first urging member for urging the first piston in the direction of releasing the friction plates; and
a second urging member for urging the second piston in the direction of releasing the friction plates with an urging force larger than an urging force of the first urging member,
wherein one of the first and second pistons has a communicating hole for connecting the engaging hydraulic chamber with the opposite hydraulic chamber and the other of the first and second pistons has a valve part for closing the communicating hole,
the first and second urging members have different urging forces so that a difference in travel distance between the first and second pistons in motion due to the different urging forces of the first and second urging members causes the valve part to open the communicating hole, and
a space is disposed between the first and second pistons, the space being isolated from the engaging hydraulic chamber and the opposite hydraulic chamber, and an air hole extends in the first piston or in the second piston, the air hole being configured to lead some of the air in the space to an outside space.

7. A frictional engagement element, comprising:
a first piston and a second piston each having a first face and a second face opposite to each other in an axial direction, the first and second pistons being movable in the axial direction;
a plurality of friction plates disposed near the second faces of the first and second pistons;
an engaging hydraulic chamber defined by the first faces of the first and second pistons, the engaging hydraulic chamber being configured to be subject to a hydraulic pressure to move the first and second pistons in a direction of pressing the friction plates;
an opposite hydraulic chamber defined by the second faces of the first and second pistons, the opposite hydraulic chamber being configured to be subject to a hydraulic pressure to move the first and second pistons in a direction of releasing the friction plates;
a first urging member for urging the first piston in the direction of releasing the friction plates; and
a second urging member for urging the second piston in the direction of releasing the friction plates with an urging force larger than an urging force of the first urging member,
wherein one of the first and second pistons has a communicating hole for connecting the engaging hydraulic chamber with the opposite hydraulic chamber and the other of the first and second pistons has a valve part for closing the communicating hole,
the first and second urging members have different urging forces so that, in a process of disengagement of the frictional engagement element a difference in travel distance between the first and second pistons in motion due to the different urging forces of the first and second urging members causes the valve part to open the communicating hole to make hydraulic oil flow from the engaging hydraulic chamber into the opposite hydraulic chamber through the communicating hole, and
the first and second urging members have different urging forces so that, in a process of engagement of the frictional engagement element, a difference in travel distance between the first and second pistons in motion due to the different urging forces of the first and second urging members causes the valve part to open the communicating hole to make hydraulic oil flow from the opposite hydraulic chamber into the engaging hydraulic chamber through the communicating hole.

\* \* \* \* \*